(12) United States Patent
Kowoll et al.

(10) Patent No.: US 9,290,709 B2
(45) Date of Patent: Mar. 22, 2016

(54) GASIFICATION REACTOR AND PROCESS FOR ENTRAINED-FLOW GASIFICATION

(75) Inventors: Johannes Kowoll, Bochum (DE); Eberhard Kuske, Soest (DE); Ralf Abraham, Bergkamen (DE); Max Heinritz-Adrian, Muenster (DE)

(73) Assignee: THYSSENKRUPP INDUSTRIAL SOLUTIONS AG, Essen (DE)

( * ) Notice: Subject to any disclaimer, the term of this patent is extended or adjusted under 35 U.S.C. 154(b) by 606 days.

(21) Appl. No.: 12/733,720

(22) PCT Filed: Sep. 18, 2008

(86) PCT No.: PCT/EP2008/007841
§ 371 (c)(1),
(2), (4) Date: Jun. 9, 2010

(87) PCT Pub. No.: WO2009/036985
PCT Pub. Date: Mar. 26, 2009

(65) Prior Publication Data
US 2010/0263278 A1    Oct. 21, 2010

(30) Foreign Application Priority Data

Sep. 18, 2007 (DE) .......... 10 2007 044 726
Mar. 5, 2008 (DE) .......... 10 2008 012 734

(51) Int. Cl.
*C10J 3/82* (2006.01)
*C10J 3/78* (2006.01)
(Continued)

(52) U.S. Cl.
CPC .. *C10J 3/78* (2013.01); *C10J 3/485* (2013.01); *C10J 3/845* (2013.01); *C10J 2200/09* (2013.01);
(Continued)

(58) Field of Classification Search
CPC ...................................................... C10J 3/845
USPC ................................. 48/197 R, 210
See application file for complete search history.

(56) References Cited

U.S. PATENT DOCUMENTS 3,473,903 A * 10/1969 Dille et al. ................. 48/212
3,841,061 A    10/1974 Pike
(Continued)

FOREIGN PATENT DOCUMENTS

CN   122 5139 A    8/1999
DE   40 01 739 A1  10/1990
(Continued)

OTHER PUBLICATIONS

Philippine Application No. 1/2010/500595, Subsequent Substantive Examination Report dated Oct. 21, 2015, two pages.
(Continued)

*Primary Examiner* — Matthew Merkling
(74) *Attorney, Agent, or Firm* — Lathrop & Gage LLP

(57) ABSTRACT

A process and device for the gasification of liquid or fine-grain solid fuel materials with the aid of oxygenous, gaseous gasification agents in a reactor is described. Liquid slag is separated on the walls of the reactor. The synthesis gas is generated in a first reaction chamber arranged in the upper part of the reactor and the feedstock is fed to the upper part. Liquid slag precipitates on its lateral walls, with free down-flow and no solidification of the slag surface. The lower side has a hole with a slag drop-off edge, from which the generated synthesis gas can be withdrawn in downward direction and the liquid slag can drop off the edge. A second chamber which is delimited by a water film is located under the opening and used to keep the synthesis gas dry and cool. A third chamber is adjacent to the bottom of the second and fed with water to cool the synthesis gas. A water bath is adjacent the bottom of the third chamber and collects the slag particles already solidified and dropped off or those particles still in the liquid phase. The synthesis gas is withdrawn from the pressure vessel in an area below or on the side of the third chamber but in any case located above the water bath.

13 Claims, 3 Drawing Sheets

(51) Int. Cl.
*C10J 3/48* (2006.01)
*C10J 3/84* (2006.01)

(52) U.S. Cl.
CPC .... *C10J 2300/093* (2013.01); *C10J 2300/0916* (2013.01); *C10J 2300/0943* (2013.01); *C10J 2300/1223* (2013.01)

(56) References Cited

U.S. PATENT DOCUMENTS

| | | | |
|---|---|---|---|
| 3,963,457 A | | 6/1976 | Hess |
| 4,247,302 A | | 1/1981 | Woldy et al. |
| 4,474,584 A | | 10/1984 | Koog |
| 4,494,963 A | | 1/1985 | Reich |
| 4,605,423 A | * | 8/1986 | Koog ................ 48/69 |
| 4,704,137 A | | 11/1987 | Richter |
| 4,801,306 A | | 1/1989 | Denbleyker |
| 4,936,871 A | | 6/1990 | Wilmer et al. |
| 4,950,308 A | | 8/1990 | Lang et al. |
| 4,992,081 A | | 2/1991 | Den Bleyker et al. |
| 5,358,696 A | | 10/1994 | Jahnke |
| 5,401,282 A | * | 3/1995 | Leininger et al. ........ 48/197 R |
| 5,441,547 A | | 8/1995 | Durrfeld et al. |
| 5,744,067 A | | 4/1998 | Jahnke |
| 5,976,203 A | | 11/1999 | Deeke et al. |
| 8,052,864 B2 | * | 11/2011 | Eilers et al. .................... 208/86 |
| 2007/0051044 A1 | | 3/2007 | Holle et al. |
| 2007/0062117 A1 | | 3/2007 | Schingnitz et al. |
| 2007/0079554 A1 | | 4/2007 | Schingnitz et al. |
| 2007/0272129 A1 | | 11/2007 | Schilder |
| 2008/0005966 A1 | | 1/2008 | Fischer et al. |

FOREIGN PATENT DOCUMENTS

| | | |
|---|---|---|
| DE | 4 025 916 A1 | 1/1991 |
| DE | 42 30 124 A1 | 3/1994 |
| DE | 197 18 131 A1 | 1/1998 |
| DE | 197 51 889 C1 | 5/1999 |
| DE | 10 2005 041 930 A1 | 3/2007 |
| DE | 10 2005 041 931 A1 | 3/2007 |
| DE | 10 2005 043 212 A1 | 3/2007 |
| DE | 10 2005 048 488 A1 | 5/2007 |
| DE | 10 2006 031 816 A1 | 1/2008 |
| EP | 0 084 343 A1 | 7/1983 |
| EP | 0 127 878 A2 | 12/1984 |
| EP | 0 278 063 A2 | 8/1988 |
| EP | 0 374 324 A1 | 6/1990 |
| EP | 0 400 740 B1 | 8/1994 |
| EP | 0 586 837 B1 | 1/1997 |
| EP | 1 097 984 A2 | 5/2001 |
| JP | 2002-80896 A | 3/2002 |
| JP | 2002-256296 A | 9/2002 |
| JP | 2004-256657 A | 9/2004 |
| JP | 2005-314493 A | 11/2005 |
| WO | WO 98/45388 A2 | 10/1998 |
| WO | WO 2005/052095 A1 | 6/2005 |

OTHER PUBLICATIONS

Mexican Application No. MX/a/2010/002998 Office Action dated Dec. 9, 2015, three pages.

* cited by examiner

GASIFICATION REACTOR AND PROCESS FOR ENTRAINED-FLOW GASIFICATION

BACKGROUND OF THE INVENTION

The invention relates to a process and device for the gasification of fine-grain fuel materials, such as powdered fuel materials from coal, petroleum coke, biological waste or fuel materials as well as liquid fuels originating from oil, tar, refinery residues and other liquid residues suited for being atomised in the gasifier in order to generate raw synthesis gas mainly consisting of carbon monoxide and hydrogen and hereinafter named raw gas.

A large number of processes and devices of this type are known already. Typical constructions are those with slag discharge at the bottom and gas outlet at the top. U.S. Pat. No. 3,963,457 describes a Koppers-Totzek gasifier with horizontal burners facing each other, a slag discharge at the bottom, gas outlet and gas quench at the top and a process with recycled, cooled gas. EP 0 400 740 B1 describes a Shell gasifier with a horizontal burner, slag discharge at the bottom and gas outlet at the top and upward gas quench and with a vertical mixing pipe. U.S. Pat. No. 4,936,871 describes a Koppers gasifier with a gas outlet at the top and upward gas quench and likewise provided with a vertical mixing pipe. U.S. Pat. No. 5,441,547 outlines a PRENFLO gasifier also provided with a gas outlet at the top and upward gas quench and likewise equipped with a vertical mixing pipe, a reversing device and downward heat exchanger. U.S. Pat. No. 4,950,308 deals with a Krupp-Koppers gasifier with a horizontal burner, slag discharge at the bottom and gas outlet at the top as well as radiation cooler and gas quench. Most of the Koppers-Totzek gasifiers had a water quench that permitted cooling down to approx. 1000° C. which was far from the dew point of the generated gas, nozzles being used for water spraying.

The disadvantage of these technologies was the elevated construction of the unit and a lack of adequacy for further downcooling of the generated raw gas. In case it would have been intended to use a water quench unit with surplus water permitting cooling of the synthesis gas down to the dew point, there would have been a risk that water penetrated into the burners arranged at the level below; which constituted a safety risk. Moreover, thermo-dynamic demerits would have occurred if the quench water had penetrated into the reaction zone of the gasifier.

There are also specific types of gasifier construction that have holes in the bottom for the discharge of the raw gas and slag as well as a water quench with immersion pipe. U.S. Pat. No. 4,247,302, for example, describes a Texaco gasifier with a burner arranged in the upper part and with a common discharge opening for gas and slag at the bottom. A separation vessel is fitted below the gasifier from which the slag flows downwards into the slag bath whereas the synthesis gas is piped through a lateral outlet and into a gas quench vessel. The disadvantage of this type is the fact that several vessels are required and that the system tends to clogging because hot slag particles that are not yet solidified must be conveyed, which particularly applies to the pipeline between the separation vessel and the quench vessel.

U.S. Pat. No. 4,494,963 deals with a Texaco gasifier with burner arranged in the upper part and a common outlet for gas and slag in the lower part. A liquid quench unit arranged below the said gasifier mainly consists of a pipe wetted with a coolant, such as water, and submerged in the water bath. Patent EP 0 278 063 A2 describes a similar system. Patent EP 0 374 324 A1 specifies how to wetten the inside of such an immersion pipe. Further typical types of construction are outlined in documents U.S. Pat. No. 4,992,081 and U.S. Pat. No. 5,744,067.

The deployment of an immersion pipe wetted with a liquid film prevents the formation of incrustations. The said film covers the wall, performs a vertical motion, cools and thus prevents the formation of incrustations. A demerit of the concept, however, is that the quench outlet temperature depends on the size and dwelling time of the gas bubbles in the water bath, which in turn influence several factors, such as the gas throughput, pressure, solids content in the water bath; this causes variation of the outlet temperature and precludes an efficient separation of the flue ashes. In addition, the lower end of the immersion pipe alternately comes into contact with very hot gas and with water, so that rapid material fatigue and formation of incrustations will occur.

Types of construction that are also known provide for a downward stream of the generated synthesis gas and slug and for a spray-type quench unit for cooling. Patent DE 40 01 739 A1, for example, describes such a gasifier, underneath which water is sprayed upon the hot gas at various levels in the form of spray cones. The cooled gas leaves the quench zone via a lateral outlet while the slag falls into a water bath. A similar technology is described in WO 98/45388 A2.

Patent DE 10 2005 048 488 A1 specifies a system equipped with several burners arranged symmetrically in the reactor head, the generated raw gas and the slag being jointly treated in a quench cooler using water sprayed for cooling down to the dew point in the range of 180° C. to 240° C., or partial cooling with simultaneous exploitation of the waste heat. Patent DE 10 2005 041 930 A1 describes how to simultaneously withdraw the slag and raw gas at the bottom, condensate water being injected by one or several rows of nozzles arranged in a circle, the slag being discharged via a water bath. The dust is removed at the end of the quench zone. Patent DE 10 2005 041 931 A1 further describes a partial quench system using nozzles arranged in the shell and cooling down to approx. 700-1100° C. with the aid of condensate water; a waste heat boiler is arranged downstream of the said unit.

Document DE 197 51 889 C1 describes a gasification process in which the hot raw gases leaving the gasifier are cooled with the aid of a quench nozzle. The ashes leave the reactor via an intensely cooled slag chute and are washed and cooled in the quench nozzle. The quench nozzle is equipped with a slag drop-off edge and a thorough mixing is obtained by means of a constriction in the quench nozzle. The slag is subsequently discharged and freed from soot. EP 0 084 343 A1 deals with a coal gasifier operating downwards against a water bath and equipped with a two-stage quench system, the first quench being arranged directly downstream of the gasifier. Document US 2007 006 2117 A1 describes a similar process. Document DE 10 2005 048 488 A1 likewise describes a gasifier which acts against a water bath and provides for quenching with the aid of water spraying.

The disadvantage of this process is that the downward stream of hot gas and the flow of water drops from the nozzles cause an intense circulation in the quench zone so that water drops penetrate the whole quench room. The said water drops, which are in the vicinity of the slag hole, thus cool the slag in such a manner that its surface solidifies and forms stalactites. Fine slag particles and water drops cause incrustations on the walls not wetted by a water film, i.e. dry walls, ceiling, nozzles in particular in the sections which alternately become dry and wet. Whenever water evaporates on the walls, incrustations will form from the impurities. The said stalactites and incrustations consequently lead to major operational problems.

There are also patent documents which describe processes in which the generated synthesis gas and the slag flow downwards separately. DE 197 18 131 A1, for example, specifies a method by which the gasification gas obtained and the melt, specifically a salt melt, are discharged separately. In this case, the synthesis gas is cooled in a discharge device by injecting water or a salt solution via nozzles. The melt is conveyed to its own bath and treated accordingly.

BRIEF SUMMARY OF THE INVENTION

The objective of the invention, therefore, is to provide an unsophisticated and efficient gasification process and a device required to exploit this process to generate raw gas by the gasification of liquid or fine-grain solids used as fuel material at a pressure of 0.3 to 8 MPa and a temperature ranging from 1200 to 2000° C., with the aid of oxygenous, gaseous gasification agents in a cooled reactor, liquid slag being separated on the walls of the said reactor housed in a pressure vessel, which eliminates the disadvantages described above.

The objective of the invention is achieved as follows:
The raw gas is generated in a first reaction chamber arranged in the upper part of the reactor,
  the feedstock being fed to the upper part,
  liquid slag precipitating on its lateral walls, with free downflow and no solidification of the slag surface,
  its lower side having a hole with a drop-off edge, from which the generated synthesis gas can be withdrawn in downward direction and the liquid slag can drop off the edge;
a second chamber is located under the said opening and used to keep the synthesis gas dry and cool, and
the second chamber being delimited by a water film produced by adequate devices and with free downflow,
a third chamber being located adjacent to the bottom of the second one and fed with water to ensure cooling of the synthesis gas,
a water bath being arranged adjacent to the bottom of the third chamber and collecting the slag particles already solidified and dropped off or those particles still in the liquid phase,
the generated and cooled synthesis gas being withdrawn from the pressure vessel in an area below or on the side of the third chamber but in any case located above the water bath.

The gasification preferably takes place in a suspension mode at a particle load that is <50 kg/m$^3$—not in a fluidised bed—with the aid of oxygenous gasification agents at an elevated pressure and a temperature exceeding the slag melting point, the generated gas and the slag on the walls leaving the gasifier via an opening in the bottom. The gasification products flow through a hot and dry zone located below the gasifier bottom and separated from the quench zone by a water curtain with free downflow, in order to prevent that the cold gas saturated with drops from the quench zone penetrates into the section of the slag drop-off edge.

Embodiments of the invention provide for a feedstock consisting of solid fuel materials, such as coal, petroleum coke, biological waste or fuel materials or fine-grain plastic materials. The grain size of the solid fuel materials should not exceed 0.5 mm. In a first step, the solid materials are pressurised in one or several parallel hopper devices, using non-condensable gases such as $N_2$ or $CO_2$, the max. pressure exceeding the gasifier pressure by 2 to 10 bars. The solid feedstock is then conveyed pneumatically from one or several feed vessels to the gasifier, preferably in the form of dense-phase conveying. Oil, tar, refinery residues or aqueous suspensions can also be used as liquid fuel. Most of the liquid fuels are suited for being pumped to the gasifier, but it is recommended that abrasive liquids be fed via hopper and pressurisation with the aid of compressed gas. It is also possible to feed a mixture of solid and liquid fuel materials. Combustible or pollutant gases are also suitable for the gasifier. The elevated gasification temperatures ensure that pollutants are thermally decomposed, whereby the solid reaction products are embedded in vitreous slag and the gaseous products leave the gasifier in the form of simple molecules such as $H_2$, $CO$, $N_2$, $HCl$ or $H_2S$.

Further embodiments of the invention provide for a gasification reaction in a cloud of dust or droplets. The feeding of fuel materials and gasification agents to the gasifier can be performed by at least two burners fixed by means of separate fixtures to the lateral wall of the first reaction chamber; the feed of the fuel material and gasification agent to the gasifier can optionally or additionally take place by means of at least one burner installed in the ceiling of the gasification reactor. Prior to entering the reactor, the stream of gasification agents can be provided with a swirl motion by means of baffle plates or a special design of the burner.

In further embodiments of the invention, the bottom of the second chamber is delimited by means a funnel-shaped water curtain, with free downflow to the zone in which it is split up by the downward jet of the generated synthesis gas. The water film separating the second chamber from the third one is speeded up preferably with the aid of a tapered water chute. In this case it is recommended that the said water chute be protected from heat or dust by means of a protective shield. The said shield may be designed as a cooled device partitioning the second chamber from an outer space, with the aid of a gaseous coolant or water sprinkling originating from the said outer space.

Water drops do not escape from a homogenous film, which is guided by a speed-up chute or provided as water curtain with free downflow, and the surface area of the said water film is smaller by several magnitudes than that of the droplet spectrum supplied by nozzles, so that the cooling effect caused by evaporation is rather low. Hence, the section of the slag drop-off edge thus remains free of water drops and hot so that solidification of the slag in the vicinity of the edge can be precluded; this constitutes an advantage of the invention. As the whole atmosphere of the second chamber remains dry, incrustations due to water evaporation cannot form on the wall.

In further embodiments of the invention, provision is made for a third chamber to be equipped with a vertical partition wall so as to ensure that the generated synthesis gas first flows downwards in the inner space formed by the said partition wall, then the synthesis gas is reversed to ascend in the outer space formed by the partition wall prior to leaving the pressure vessel. It is recommended that the partition wall be wetted with water on the inner and outer sides.

Further embodiments of the invention provide for a circulating stream to be generated in the water bath arranged in the lower section. It is recommended that the whole water inventory be slightly acidified. Provision can also be made for the water originating from the water bath in such a manner that it can be returned to the third space by means of a pumping facility in order to be used for the water film formation.

The invention also includes a gasification reactor required to perform the process described above, featuring the following details:

A first reaction chamber is arranged in the upper part of the reactor,
  the said upper part of that chamber houses a feeding device for the feedstock;
  the lateral walls of that chamber are provided with tubes having internal cooling designed to form a membrane wall or instead, with tube coils from which liquid slag can freely flow downwards so that the surface of this slag cannot solidify;
  the lower side of the reaction chamber has an opening with a slag drop-off edge;
a second chamber is located under the said opening which is used to keep the synthesis gas dry and hot, and
a device for producing a water film is provided;
a third chamber is located underneath the second one and equipped with water supply equipment;
a device housing a water bath is arranged adjacent to the bottom of the third chamber, including a withdrawing device for a mixture of water and slag;
a withdrawing device for removing the raw gas from the reactor is installed below or on the side of the third chamber.

In further embodiments of the invention, at least two burners are provided in the first reaction chamber and attached by separate fixtures to the lateral wall of the said chamber. The burners are preferably aligned in a secant-type manner in that space, at a horizontal angle of 20° and a vertical angle of 45°. Moreover, it is also feasible to mount at least one burner in the ceiling of the gasification reactor.

Further embodiments of the invention provide for a tapered water chute arranged between the second and third chamber, a protective shield being mounted between the second reaction chamber and the water chute.

In a further embodiment of the invention, a vertical partition wall is installed in the third chamber.

In a further embodiment of the invention, the device accommodating the water bath is equipped with a central slag collecting vessel and an annular space for water laden with fine dust particles.

BRIEF DESCRIPTION OF THE DRAWINGS

The invention is hereinafter explained in detail on the basis of three examples.

Figure 1:
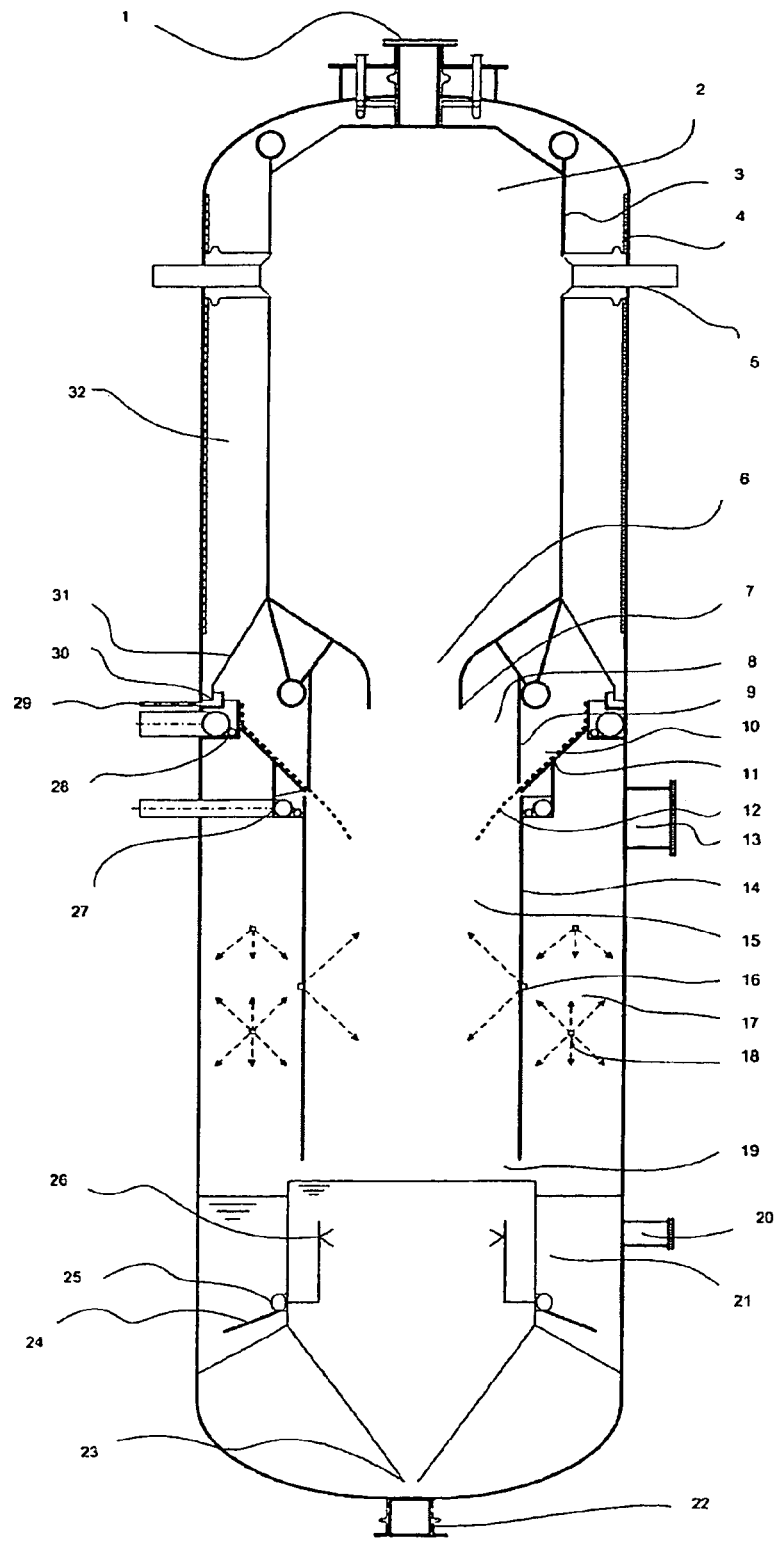
FIG. 1 is a schematic representation of the inventive gasification reactor and shows its longitudinal sectional view.

This invention, however, is not restricted to the three examples referred to above.

DETAILED DESCRIPTION OF THE INVENTION

The gasification of the fuel material takes place with the aid of an oxygenous gasification agent in the reaction chamber 2 at a pressure of 0.3-8 MPa and at temperatures above the ash melting point, i.e. 1200-2500° C. The cooled reaction vessel 3 protects the pressure vessel 4 from high temperatures. The annular space 32 is supplied with a minor stream of cold gas, e.g. nitrogen, during continuous operation. The space is protected from penetration of hot gases by means of a water seal 30. In the case of a quick pressure rise in the reaction chamber 2, however, hot gas may penetrate into the said annular space 32. In order to protect the pressure vessel 4 from being heated in the event of a temporary or accidental intrusion of hot gas, the internal wall of the said vessel 4 has a thermal insulation. Fuel materials, reaction agents and, optionally, waste materials to be disposed of are fed via at least two burners 5 arranged laterally.

Liquid slag precipitated on the walls of the reaction vessel 3 flows down the walls to the outlet opening 6, falls off the slag drop-off edge 7, either dropwise or in a stream into the water bath 21. The generated, dust-laden gas from the reaction chamber 2 also flows through the opening 6, i.e. passing first through a hot and dry space 8 and then into the quench room 15. In order to preclude a reflux of cold, drop-laden gases from the quench room 15 into the hot space 8, a water curtain 12 is produced with the aid of the feeder 28 and the tapered speed-up chute 11 and flows concentrically into the gas chamber. This curtain 12 is split up by the downward jet of hot gas or slag coming from the opening 6, when it hits upon the said jet.

The protective shield 9 cooled with a coolant internally or with a water film externally and optionally cleaned with a rapping device, protects the speed-up chute 11 and space 10 located above, from high heat and dust load so that a formation of incrustations is avoided to a very large extent. The water curtain 12 that has a thickness of some millimeters changes into a flow of drops which evaporate or vaporise and thoroughly cool the hot gas. The water supply quantity, that permits the formation of a water film on the speed-up chute 11 and/or of a curtain 12, exceeds the amount of water required to compensate for losses due to the evaporation or vaporisation. This water surplus is available for wetting of the partition wall 14 of the quench room 15 and for scrubbing the gas to remove fine dust particles.

The vertical walls in this area can additionally be wetted with water from the water feeder 27 coming via the overflow and from the nozzles 16. Nozzles that produce a fine droplet spectrum can be installed to intensify the gas cooling and to remove the flue ash. In order to avoid any supporting area for incrustations in the quench room 15 which has a high dust load, the nozzles 16 are integrated into the wall 14. The cooled gas is sent via the gap 19 into the annular space 17. The 180° reversal of the gas and the low velocity of the upward stream facilitate the removal of larger ash particles and water drops. Water is also sprayed in the annular space 17 via the nozzles 18 primarily to scrub the stream for dust removal.

Due to the gas outlet 13 through the nozzles, the gas stream becomes asymmetrical in the quench room and annular space, which leads to locally higher velocities in the annular space and to a higher amount of flue ash entrained. In case of a uniform injection of the water spray to the annular space 17, the water drops in suspension cause an approximately equal drop in pressure in the whole annular cross section, which contributes to a more homogenous gas stream in the annular space 17.

A slag collecting vessel 23 is installed in the water bath 21 below the slag reversal section through the gap 19. The said vessel 23 is equipped with concentrically arranged nozzles 26 so that larger slag particles can be additionally cooled thoroughly. The water is supplied via the circular distributor 25 which is installed on the outside of vessel 23 and induces a stream flow in the water bath 21 by means of a nozzle-type initiator 24 so that deposits are avoided.

The slag discharge device 22 conveys the slag via a slag crusher into a slag hopper in which the slag is cooled down to approx. 60° C. using process water and it is subsequently withdrawn from the process by a slag extractor.

In a typical case of application, 50 kg/s of dried and crushed lignite are gasified at 40 bars and 1500° C., which equals a chemical conversion of 1 GW. 85 kg/s of raw gas are generated, an operation which also produces 1 kg/s of flue ash and 3 kg/s of liquid slag. 70 kg/s of water are evaporated for quenching, 140 kg/s of water being fed to the water curtain 12; the water not evaporated together with the water for wetting the surface areas to be kept wet is discharged and withdrawn via the water discharge nozzles 20 and discharged into the water bath 21 and then returned by means of a circulation pump to the various feed points 16, 18, 25, 27 and 28 in the quench area. In order to separate the flue ash, the annular space 17 is equipped with a total of 24 full cone valves 18 arranged at two levels and rated for a water throughput of 160 kg/s. The water also flows into the water bath 21.

Figure 2:
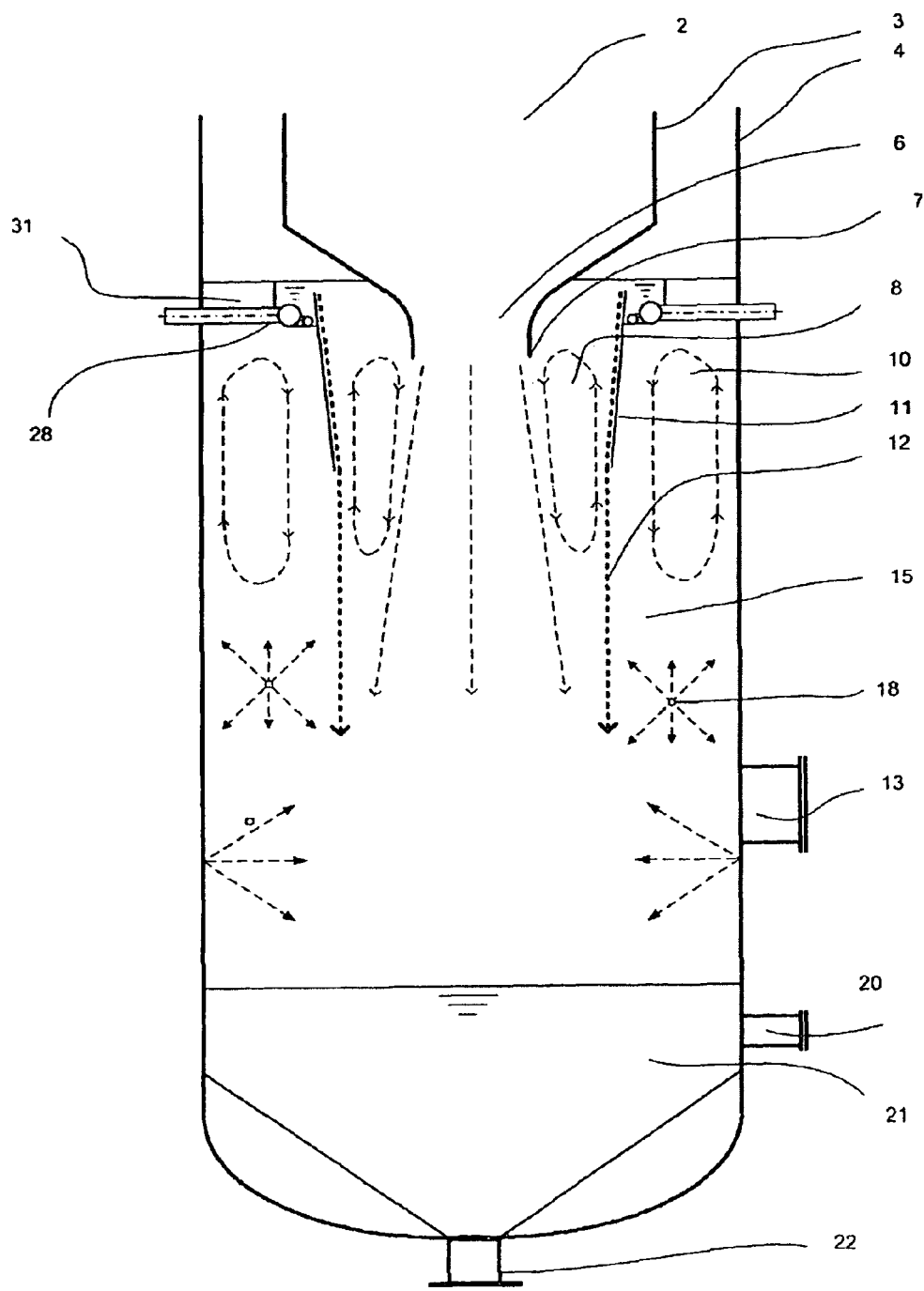
FIG. 2 shows an alternative design of the lower part of the said reactor.

FIG. 2 shows an alternative type of design for the second and third spaces. A particularly steep speed-up chute 11 is provided in this case. It is thus possible to omit a shielding and a partition wall in the third chamber. The downward water curtain 12 separates the hot and drop-free central space 8 from the cold and humid room 15, thus avoiding a circulation of the drop-laden raw gas in the vicinity of the slag drop-off edge 7 and consequently a too intense cooling of the slag on the drop-off edge 7. The oblong dashed lines in FIG. 2 depict the separate circulation patterns in the hot and humid rooms. The downward water curtain 12 exhibits a negligible radial velocity component only; thus the hot and dry room 8 is merely closed by the propagation of the gas jet stream leaving the outlet opening 6 so that this room becomes longer than a room that has a water film injected radially. As an option, water can be injected via nozzles 18 installed between the downward surface areas of the water film and the pressure vessel. The intention is to obtain an intense radial injection of the quench water exactly at the intersection of the downward surface area of the water film and the shell surface area of the propagation range of the gas jet stream originating from the outlet opening 6.

Figure 3:
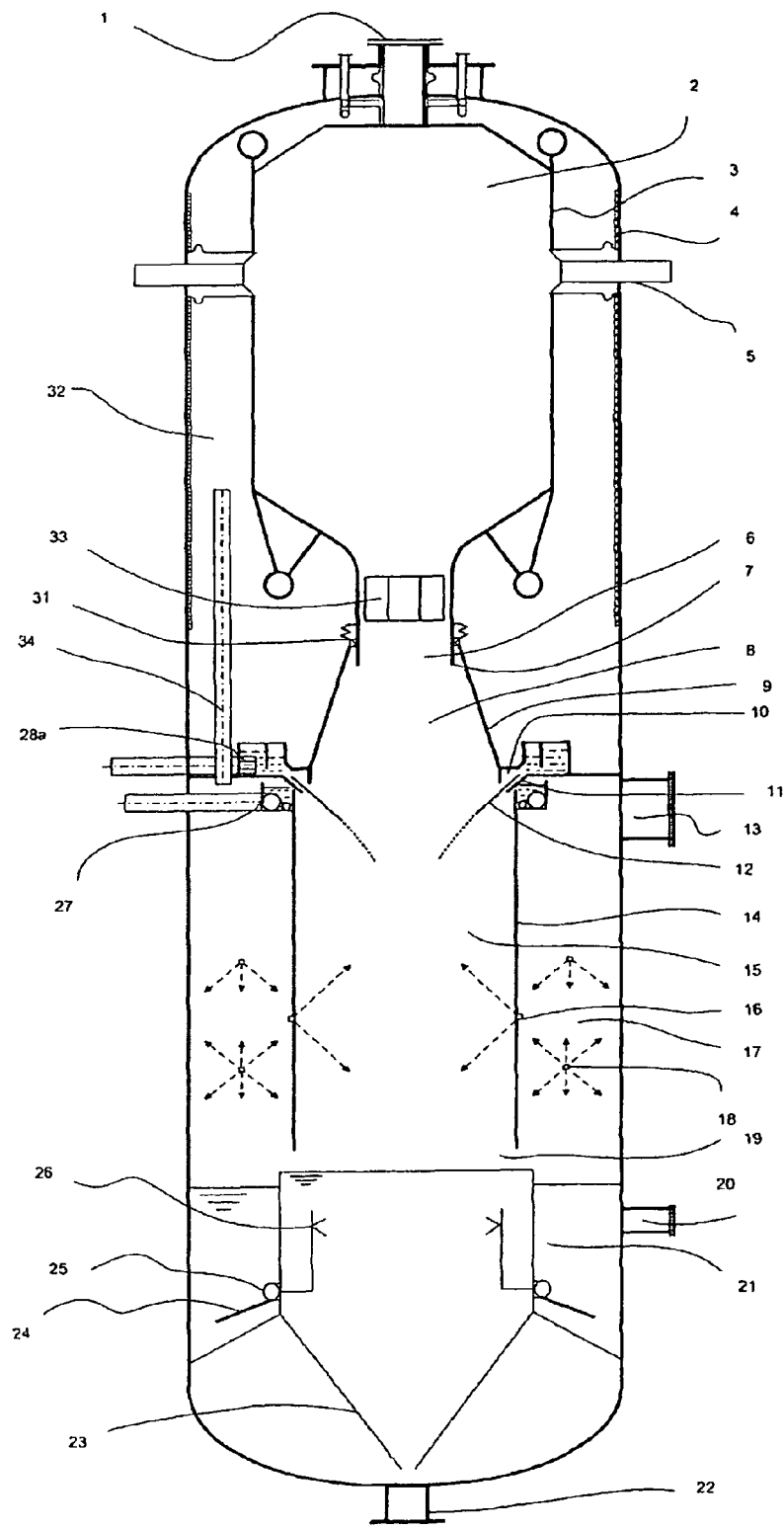
FIG. 3 illustrates a further type of design of the inventive gasification reactor.

FIG. 3 shows a further type of design with a flow straightener 33 installed in the outlet section of the gasifier in order to weaken the twist generated in the gasifier and reinforced by the outlet contraction resulting from the pirouette effect. This avoids the centrifugal forces acting on the slag particles and the fouling tendency on the walls of the hot space 8. In this particular case the slag drop-off edge 7 is located below the flow straightener 33. As an option it is possible to provide a further drop-off edge 7a arranged upstream and designed as drop-off ring or drop-off grooves so that the major part of the slag can be discharged.

According to a further typical embodiment, the slag flows are bundled and several jets of slag are injected into the hot core of the stream. Hence, the slag is kept far away from the walls of the quench room 15.

The water required for the speed-up chute 11 is sent to a circumferential groove 28a from which it flows tangentially across several slots. The cross-sectional area of the groove is reduced downstream of each slot by the amount of the slot cross-section in such a manner that the flow velocity remains approximately the same along the whole groove and in all slots. The water originating from the slots first enters into the circumferential groove 28a and passes further on through the downstream section with an adjusted width into a further groove, from which it flows across a slot upon the speed-up chute 11. Upon accelerating its flow velocity, the water forms the water curtain 12. The cascade of grooves is applied to ensure a uniform water effluent.

The annular spaces 17 and 32 are separated from each other by the partition plate 31 and an expansion joint. The pressure balance of these spaces is ensured by means of a pressure equalisation line 34 which can be installed either inside or outside of the pressure vessel 4. The upper annular space 32 is fed with purge gas to preclude any penetration of humid gas during normal operation.

KEY TO REFERENCED ITEMS

1 Manhole
2 Reaction chamber of gasifier
3 Reaction vessel
4 Pressure vessel
5 Burner
6 Outlet opening for gasification products
7 Slag drop-off edge
8 Space with hot and dry gas
9 Protective shield
10 Space with cold gas
11 Water-film speed-up chute
12 Water curtain (with free downflow)
13 Gas outlet
14 Water-wetted partition wall
15 Quench room
16 Nozzle integrated into the partition wall
17 Annular space (bottom)
18 Nozzles
19 Gap
20 Water discharge nozzles
21 Water bath
22 Slag discharge device
23 Slag collecting vessel
24 Initiator for circulated stream
25 Circular distributor
26 Concentrically arranged nozzles
27 Water feeder for water film on walls
28 Water feeder for water film
28a Circumferential groove
29 Water feeder for water seal
30 Water seal
31 Partition plate
32 Annular space (top)
33 Flow straightener
34 Equalisation line

The invention claimed is:
1. A process for the generation of synthesis gas by gasification of liquid or fine-grain, solid fuel materials at a pressure of 0.3 to 8 MPa and a temperature ranging from 1200 to 2000° C., with the aid of oxygenous, gaseous gasification agents in a cooled reactor, liquid slag being separated on the walls of the said reactor which is housed in a pressure vessel, comprising:
generating synthesis gas in a first reaction chamber arranged in the upper part of the reactor;
feeding the feedstock to the upper part;
precipitating liquid slag on its lateral walls, with free downflow and no solidification on the slag surface;
providing a hole with a drop off edge on the reactor's lower side, from which the generated synthesis gas can be withdrawn in downward direction and the liquid slag can drop off the said edge;
providing a second chamber located under the opening and used to keep the synthesis gas dry and cool;
delimiting the second chamber by a water film produced by adequate devices and with free downflow;
providing a third chamber located adjacent to the bottom of the second one and fed with water to ensure cooling of the synthesis gas, wherein the water film separates the second chamber and the third chamber;

arranging a water bath adjacent to the bottom of the third chamber and collecting the slag particles already solidified and dropped off or those particles still in the liquid phase; and withdrawing the generated and cooled gas from the pressure vessel in an area below or on the side of the third chamber but in any case located above the water bath; wherein the water film separating the second chamber from the third one is speeded up with the aid of a tapered water chute which is protected from heat or dust by means of a protective shield, which shield is designed as a cooled device partitioning the second chamber from an outer space with the aid of a gaseous coolant or water sprinkling originating from the outer space.

2. The process in accordance with claim 1, wherein solid fuel materials, such as coal, petroleum coke, biological waste or fuel materials or fine-grain plastic materials can be used as feedstock.

3. The process in accordance with claim 1, wherein the grain size of the solid fuel materials does not exceed 0.5 mm.

4. The process in accordance with claim 1, wherein oil, tar, refinery residues or aqueous suspensions are used as liquid fuel.

5. The process in accordance with claim 1, wherein the gasification reaction takes place in a cloud of dust or droplets.

6. The process in accordance with claim 1, wherein the feeding of the fuel materials and gasification agents to the gasifier can be performed by at least two burners fixed by means of separate fixtures to the lateral wall of the first reaction chamber, the burners being optionally arranged at one or several levels.

7. The process in accordance with claim 1, wherein the feed of the fuel materials and gasification agents to the gasifier can take place by at least one burner arranged in the ceiling of the gasification reactor.

8. The process in accordance with claim 1, wherein prior to entering the reactor, the stream of gasification agents can be provided with a swirl motion by means of baffle plates or a special design of the burner.

9. The process in accordance with claim 1, wherein the third chamber is equipped with a vertical partition wall so as to ensure that the generated synthesis gas first flows downwards in the inner space formed by the said partition wall, the said gas then being reversed to ascend in the outer space formed by the partition wall prior to leaving the pressure vessel.

10. The process in accordance with claim 9, wherein the partition wall is wetted with water on the inner and outer sides.

11. The process in accordance with claim 1, wherein a circulating stream is generated in the water bath arranged in the lower section.

12. The process in accordance with claim 1, wherein the water originating from the water bath is returned to the third chamber by means of an appropriate pumping facility and used for the formation of a water film.

13. Process in accordance with claim 1, wherein the water used is slightly acidified.

* * * * *